(12) United States Patent
Appia et al.

(10) Patent No.: US 9,554,057 B2
(45) Date of Patent: Jan. 24, 2017

(54) WIDE DYNAMIC RANGE DEPTH IMAGING

(71) Applicant: Texas Instruments Incorporated, Dallas, TX (US)

(72) Inventors: Vikram VijayanBabu Appia, Dallas, TX (US); Aziz Umit Batur, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/322,898

(22) Filed: Jul. 2, 2014

(65) Prior Publication Data

US 2015/0022693 A1 Jan. 22, 2015

Related U.S. Application Data

(60) Provisional application No. 61/846,788, filed on Jul. 16, 2013.

(51) Int. Cl.
| | |
|---|---|
| *H04N 5/235* | (2006.01) |
| *G06T 5/00* | (2006.01) |
| *G06T 5/50* | (2006.01) |
| *G06T 7/00* | (2006.01) |

(52) U.S. Cl.
CPC .............. *H04N 5/2355* (2013.01); *G06T 5/007* (2013.01); *G06T 5/50* (2013.01); *G06T 7/0057* (2013.01); *G06T 2207/10028* (2013.01); *G06T 2207/20208* (2013.01); *G06T 2207/20212* (2013.01)

(58) Field of Classification Search
CPC .................................................. H04N 13/0253
USPC ...................................... 348/239, 240.2, 370
See application file for complete search history.

(56) References Cited

U.S. PATENT DOCUMENTS

| | | | | |
|---|---|---|---|---|
| 2004/0119875 | A1* | 6/2004 | Hayaishi et al. | 348/362 |
| 2004/0212725 | A1* | 10/2004 | Raskar | 348/370 |
| 2010/0309332 | A1* | 12/2010 | Ueda | H04N 5/23293 348/229.1 |

* cited by examiner

*Primary Examiner* — Joel Fosselman
(74) *Attorney, Agent, or Firm* — Gregory J. Albin; Charles A. Brill; Frank D. Cimino

(57) ABSTRACT

Wide dynamic range depth imaging in a structured light device is provided that improves depth maps for scenes with a wide range of albedo values under varying light conditions. A structured light pattern, e.g., a time-multiplexed structured light pattern, is projected into a scene at various projection times and a camera captures images of the scene for at least the same exposure times as the projection times. A depth image is computed for each of the projection/exposure times and the resulting depth images are combined to generate a composite depth image.

7 Claims, 4 Drawing Sheets

WIDE DYNAMIC RANGE DEPTH IMAGING

CROSS-REFERENCE TO RELATED APPLICATIONS

This application claims benefit of U.S. Provisional Patent Application Ser. No. 61/846,788, filed Jul. 16, 2013, which is incorporated by reference herein in its entirety.

BACKGROUND OF THE INVENTION

Field of the Invention

Embodiments of the present invention generally relate to wide dynamic range depth imaging in a structured light imaging device.

Description of the Related Art

In structured light imaging devices, a projector-camera pair is used to estimate the three-dimensional (3D) depth of a scene and shape of objects in the scene. The principle behind structured light imaging is to project patterns on objects/scenes of interest and capture images with the projected pattern. The depth is estimated based on variations of the pattern in the captured image in comparison to the projected pattern.

The amount of light reflected by the objects in the scene varies depending on object properties such as color, albedo (reflectance) etc. The light incident on the objects is a combination of ambient light and light from the projector. For a fixed camera exposure time and projector projection time, some objects may be under-exposed and other objects may be over-exposed. Darker objects tend to be under-exposed and the projected pattern is not detected in these regions. Conversely, brighter objects may reflect the projected pattern and the ambient light and be over-exposed, which makes the pattern undetectable in such regions.

SUMMARY

Embodiments of the present invention relate to methods and apparatus for wide dynamic range depth imaging. In one aspect, a method of image processing in a structured light imaging device having a camera and a projector is provided that includes generating a first depth image based on a first at least one image of a scene, wherein the first at least one image is captured by projecting a structured light pattern into the scene by the projector for a first projection time and concurrently capturing the first at least one image by the camera for at least a first exposure time equal to the first projection time, generating a second depth image based on a second at least one image of the scene, wherein the second at least one image is captured by projecting the structured light pattern into the scene by the projector for a second projection time and concurrently capturing the second at least one image by the camera for at least a second exposure time equal to the second projection time, wherein the second projection time is different from the first projection time, and generating a composite depth image by combining the first depth image and the second depth image.

In one aspect, a structured light imaging device is provided that includes a projector configured to project a structured light pattern into a scene, a camera configured to capture images of the scene, and a memory configured to store software instructions that, when executed by at least one processor in the structured light imaging device, cause a method of imaging processing to be performed. The method includes generating a first depth image based on a first at least one image of a scene, wherein the first at least one image is captured by projecting a structured light pattern into the scene by the projector for a first projection time and concurrently capturing the first at least one image by the camera for at least a first exposure time equal to the first projection time, generating a second depth image based on a second at least one image of the scene, wherein the second at least one image is captured by projecting the structured light pattern into the scene by the projector for a second projection time and concurrently capturing the second at least one image by the camera for at least a second exposure time equal to the second projection, wherein the second projection time is different from the first projection time, and generating a composite depth image by combining the first depth image and the second depth image.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
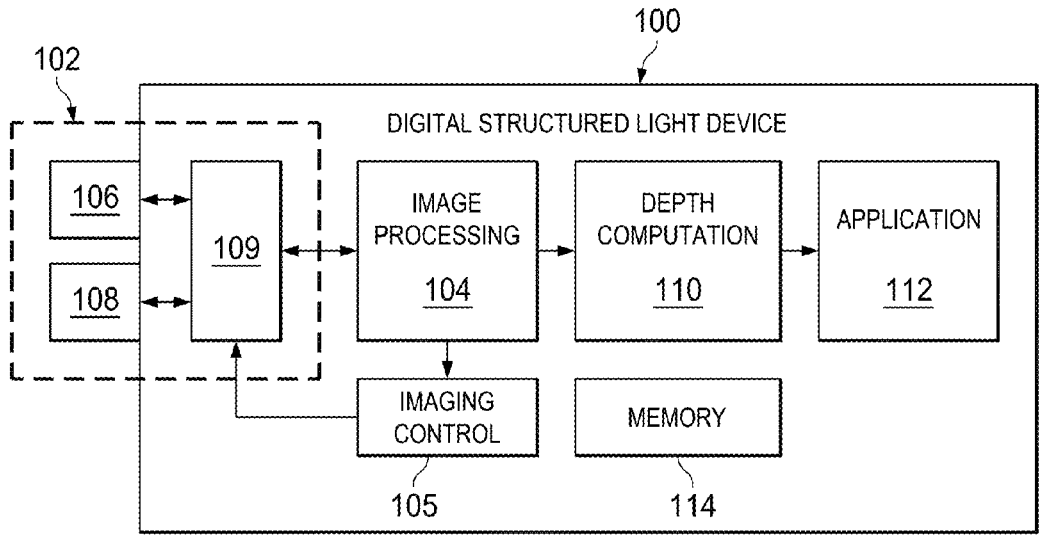
FIG. 1 is a block diagram of an example digital structured light device.

Specific embodiments of the invention will now be described in detail with reference to the accompanying figures. Like elements in the various figures are denoted by like reference numerals for consistency.

As previously mentioned, in structured light imaging, darker objects in a scene may be under-exposed and brighter objects may be over-exposed, making the projected pattern undetectable in corresponding regions of captured images. Not being able to detect the pattern adversely affects the quality of depth maps computed for the scene.

Embodiments of the invention provide for wide dynamic range depth imaging in a structured light device that provides improved depth maps for scenes with a wide range of albedo values under varying light conditions. A structured light pattern, e.g., a time-multiplexed structured light pattern, is projected into the scene at various projection times and a camera captures images of the scene at the same exposure times. Using different exposure times improves the detection of a light pattern in darker and brighter regions of the scene as shorter exposure times tend not to over-expose brighter regions and longer exposure times allow more light to be captured in darker regions. A depth image is computed for each of the exposure/projection times and the resulting depth images are combined to generate a composite depth image. Thus, the composite depth image may include depths for brighter and/or darker regions that may not have had a detectable pattern if depth was computed from a single exposure image.

FIG. 1 is a block diagram of an example digital structured light device 100 configured to use an adaptive structured light pattern. More specifically, the digital structured light device 100 is configured to perform an embodiment of the method of FIG. 2 to generate wide dynamic range (WDR) depth images.

The digital structured light device 100 includes a structured light imaging sub-system 102, an image processing component 104, an imaging control component 105, a memory component 114, a depth computation component 110, and an application component 112. The components of the digital structured light device 100 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions may be stored in memory in the memory component 114 and executed by one or more processors (not specifically shown).

The structured light imaging sub-system 102 includes an imaging sensor component 106, a projector component 108, and a controller component 109. The imaging sensor component 106 is an imaging sensor system arranged to capture image signals of a scene and the projector component 108 is a projection system arranged to project one or more structured light patterns, e.g., a time-multiplexed structured light pattern, into the scene. The imaging sensor component 106 includes a lens assembly, a lens actuator, an aperture, and an imaging sensor. The projector component 108 includes a projection lens assembly, a lens actuator, an aperture, a light source, and projection circuitry. The structured light imaging sub-system 102 also includes circuitry for controlling various aspects of the operation of the sub-system, such as, for example, aperture opening amount, exposure or projection time, synchronization of the imaging sensor component 106 and the projector component 108, etc. The controller component 109 includes functionality to convey control information from the imaging control component 105 to the imaging sensor component 106 and the projector component 108, to convert analog image signals from the imaging sensor component 106 to digital image signals, and to provide the digital image signals to the image component 104.

In some embodiments, the imaging sensor component 106 and the projection component 108 may be arranged vertically such that one component is on top of the other, i.e., the two components have a vertical separation baseline. In some embodiments, the imaging sensor component 106 and the projection component 108 may be arranged horizontally such that one component is next to the other, i.e., the two components have a horizontal separation baseline.

The image processing component 104 divides the incoming digital signal(s) into frames of pixels and processes each frame to enhance the image data in the frame. The processing performed may include one or more image enhancement techniques such as, for example, one or more of black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness.

Figure 2:
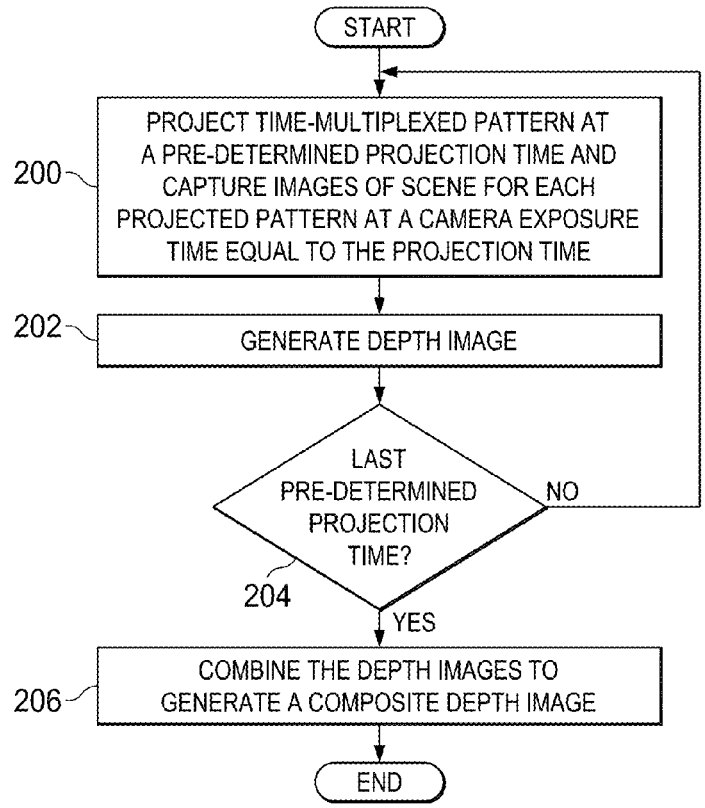
FIG. 2 is a flow diagram of a method.

The depth computation component 110 then uses the enhanced image data to perform the processing steps of an embodiment of the method of FIG. 2 to generate a composite depth image. The composite depth image is provided to the application component 112 for further application specific processing.

The memory component 114 may be on-chip memory, external memory, or a combination thereof. Any suitable memory design may be used. For example, the memory component 110 may include static random access memory (SRAM), dynamic random access memory (DRAM), synchronous DRAM (SDRAM), read-only memory (ROM), flash memory, a combination thereof, or the like. Various components in the digital structured light device 100 may store information in memory in the memory component 114 as images are processed.

Further, the memory component 114 may store any software instructions that are executed by one or more processors (not shown) to perform some or all of the described functionality of the various components. Some or all of the software instructions may be initially stored in a computer-readable medium such as a compact disc (CD), a diskette, a tape, a file, memory, or any other computer readable storage device and loaded and stored on the digital structured light device 100. In some cases, the software instructions may also be sold in a computer program product, which includes the computer-readable medium and packaging materials for the computer-readable medium. In some cases, the software instructions may be distributed to the digital structured light device 100 via removable computer readable media (e.g., floppy disk, optical disk, flash memory, USB key), via a transmission path from computer readable media on another computer system (e.g., a server), etc.

The imaging control component 105 controls the overall functioning of the structured light imaging sub-system 102. For example, the imaging control component 105 may adjust the focus of the imaging sensor component 106 and/or the projector component 108 based on the focus quality and scene brightness, respectively, determined by the image processing component 104. The imaging control component 105 may also control the synchronization of the imaging sensor component 106 with the projector component 108 to capture images of the scene with the projected pattern. Further, the imaging control component 105 controls the projection times the projection component 108 uses for projecting the structured light pattern, e.g., a time-multiplexed pattern, into a scene and the exposure times the imaging sensor component 106 uses for capturing images of the scene as needed for performing an embodiment of the method of FIG. 2.

More specifically, the imaging control component 105 causes the projection component 108 and the imaging sensor component 106 to operate concurrently at various pre-determined projection and exposure times. In embodiments of the invention, the particular projection and exposure times and the number of projection and exposure times used are pre-determined and may depend on the particular application of the structured light device 100 and/or capabilities of the particular projection component and imaging sensor component in the device. For example, the expected scene content, the expected ambient light conditions, the projection times available for the particular projection component, and the exposure times available for the particular imaging component may be considered in determining the number of projection and exposure times to be used and the particular projection and exposure times.

The application component 112 receives the depth image and performs any additional processing needed for the particular application of the digital structured light device 100. The application component 112 may implement an application or applications that rely on a three-dimensional (3D) representation of a scene. For example, the application component 112 may be a 3D reconstruction application that generates point clouds (a collection of x, y, and z coordinates representing the locations of objects in 3D space) from depth maps. In another example, the application component 112 may be an application that creates 3D models for computer rendering, physical printing of 3D objects, or fault detection.

FIG. 2 is a flow diagram of a method for wide dynamic range (WDR) depth imaging that may be performed by a structured light imaging device, e.g., the digital structured light device 100 of FIG. 1. The method assumes that a pre-determined number of pre-determined projection and exposure times is to be used for generating a WDR depth image. Considerations for selecting particular projection and exposure times and the number of projection and exposure times are previously discussed herein. Further, the method assumes that a pre-determined time-multiplexed structured light pattern is used. The time-multiplexed structured light pattern may be any suitable pattern for the particular application of the structured light imaging device.

Initially, the pre-determined time-multiplexed structured light pattern is projected 200 into the scene by the projector of the structured light imaging device at a pre-determined projection time and a camera in the structured light imaging device with a field of view substantially overlapping that of the projector concurrently captures images of the scene at an exposure time equal to the projection time. That is, the projector projects each pattern of the time-multiplexed pattern into the scene at the pre-determined projection time and the camera captures an image of the scene containing the projected pattern at an exposure time that is the same as the projection time.

After images are captured of each pattern in the time-multiplexed pattern, a depth image corresponding to the pre-determined projection time is generated 202 based on the captured images and the pattern images of the time-multiplexed pattern. Generating a depth image from multiple images of a time-multiplexed structured light pattern is well known and any algorithm appropriate for the particular time-multiplexed pattern may be used.

A check is then made 204 to determine if the current pre-determined projection time is the last of the pre-determined projection times. If the current pre-determined projection time is not the last one, then the depth image generation steps (200, 202) are repeated to generate a depth image at the next pre-determined projection time. If the current pre-determined projection time is the last one, the depth images are then combined 203 to generate a composite depth image (WDR depth image) that is output for further processing as per the particular application of the structured light imaging device. In some embodiments, the depth images are combined to generate the composite depth image using a simple "Xor-like" operation. For example, if two images are to be combined, for a given location in the composite image, if a depth value is present in one image, use that value or else use the depth value from the other image, if present. If neither image has a depth value for the location, then no depth value is provided for the location. If there is a depth value for the location in both images, use either one because the depth values are identical. One of ordinary skill in the art will understand how more than two depth images may be combined to generate the composite image.

Figure 3A:
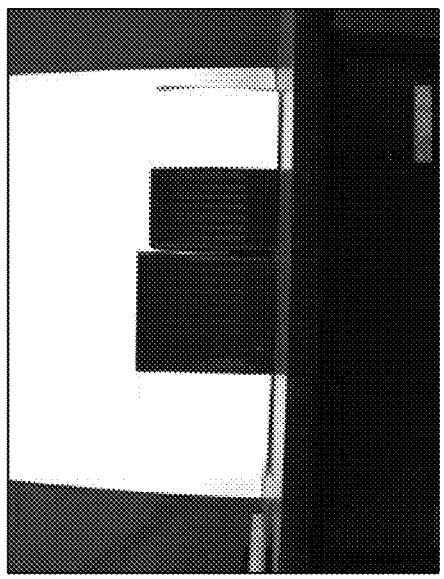
FIGS. 3A-3B, 4A-4C, and 5A-5C are examples.

FIGS. 3A-5C are examples illustrating the efficacy of an embodiment of the method of FIG. 2. For these examples, a time-multiplexed structured light pattern composed of multiple gray code patterns was used. FIGS. 3A and 3B show images of a scene with both bright and dark objects captured at two different projection/exposure times, 6 milliseconds (ms) and 33 ms, respectively. These images illustrate the need for different projection/exposure times. With the shorter projection/exposure time (FIG. 3A), insufficient light is captured by the camera in the darker regions such that the projected pattern is not detectable, and thus depth cannot be estimated in those regions. Similarly, in the image with longer projection/exposure time (FIG. 3B), the brighter region is over-exposed such that the projected pattern is not detectable, and thus depth cannot be estimated in this region.

Figure 3B:
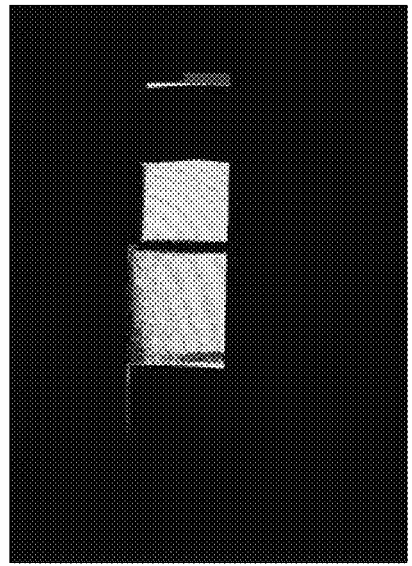
Figure 4A:
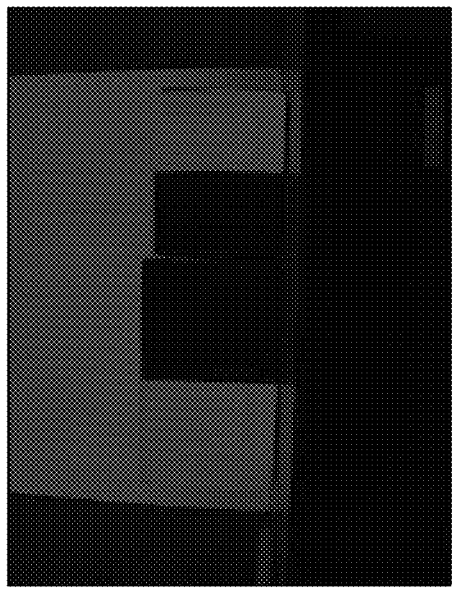
Figure 4B:
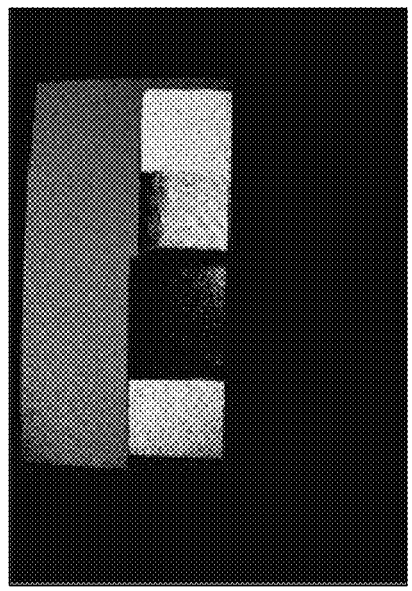
Figure 4C:
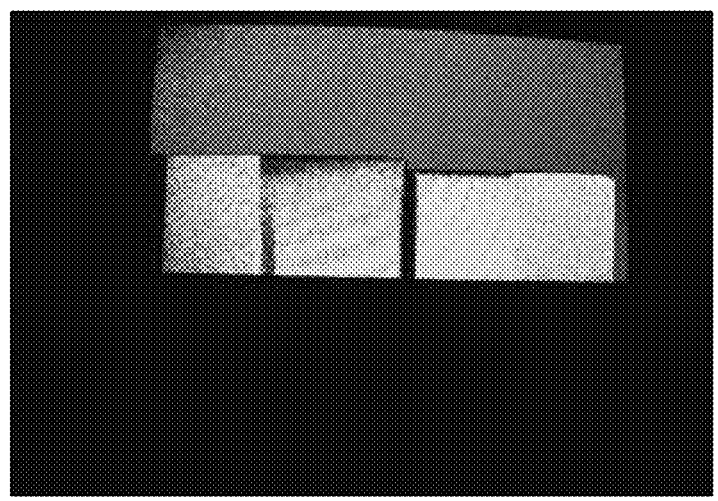
Figure 5A:
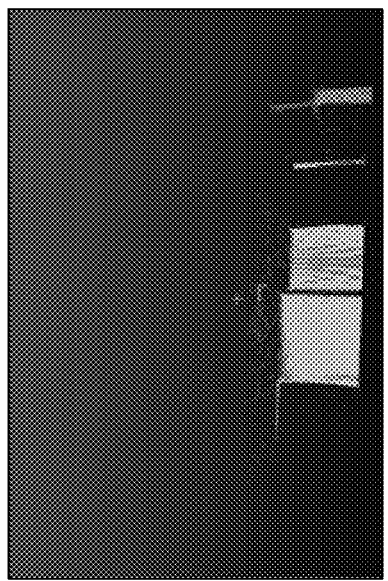
Figure 5B:
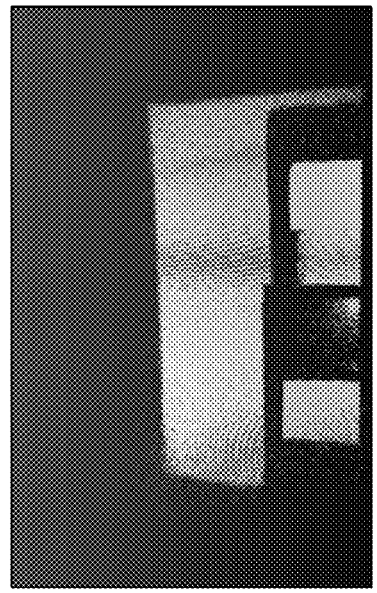
Figure 5C:
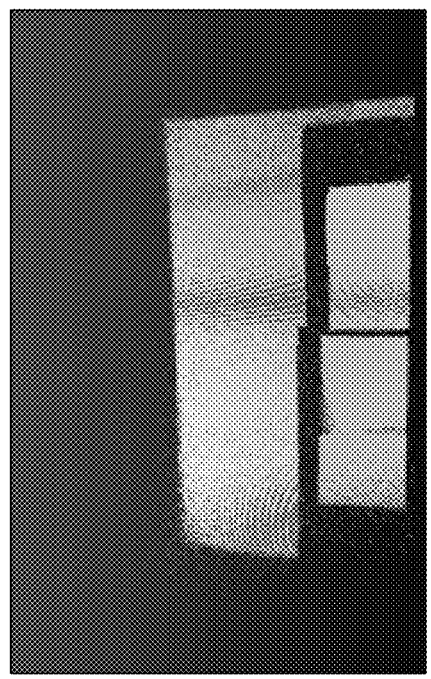

FIGS. 4A and 4B show depth maps (images) generated from each of the captured images of FIGS. 3A and 3B, respectively. As these figures demonstrate, with the lower projection/exposure time (FIG. 4A), the brighter regions are reconstructed but the darker regions are lost due to under-exposure. Similarly, with the higher projection/exposure time (FIG. 4B), the darker regions are reconstructed, but the brighter regions are lost due to over-exposure. FIG. 4C shows the composite depth map generated by combining the depth maps of FIGS. 4A and 4B. Note that this composite depth map includes depths for the brighter and darker regions. FIGS. 5A and 5B show point clouds generated from the depth maps of FIGS. 4A and 4B, respectively, and FIG. 5C shows the point cloud generated from the composite depth map of FIG. 4C.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which the projected structured light pattern is assumed to be a time-multiplexed pattern. One of ordinary skill in the art will understand embodiments in which a different type of structured light pattern is used, e.g., a fixed single pattern or a continuous pattern. For example, for single pattern images, depth/disparity is typically determined by some form of pattern matching, and thus the depths for different exposure values may be different. In such cases, post-processing such as connected components is commonly used to eliminate incorrect estimates. Once these inconsistent values are eliminated, linear combination can be used to combine the depth images to generate a composite depth image.

In another example, embodiments have been described herein in which the projector and the camera operate at the same projection and exposure times. One of ordinary skill in the art will understand embodiments in which the camera does not support some or all of the desired pattern projection times. In such embodiments, if the camera does not support a particular projector projection time, the camera can be operated at an exposure time longer than the projector projection time. For example, if the camera supports a single 30 ms exposure time and a shorter pattern projection time, e.g., 10 ms, is desired for computing a depth image, the camera can operate at the 30 ms exposure time while the projector projects for 10 ms and then projects nothing for the remaining 20 ms.

Embodiments of the method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method of image processing in a structured light imaging device comprising a camera and a projector, the method comprising:
generating a first depth image based on a first at least one image of a scene, wherein the first at least one image is captured by projecting a structured light pattern into the scene by the projector for a first projection time and concurrently capturing the first at least one image by the camera for a first exposure time equal to the first projection time;
generating a second depth image based on a second at least one image of the scene, wherein the second at least one image is captured by projecting the structured light pattern into the scene by the projector for a second projection time and concurrently capturing the second at least one image by the camera for a second exposure time equal to the second projection time, wherein the second projection time is different from the first projection time; and
generating a composite depth image by combining the first depth image and the second depth image.

2. The method of claim 1, further comprising:
generating a third depth image based on a third at least one image of the scene, wherein the third at least one image is captured by projecting the structured light pattern into the scene by the projector for a third projection time and concurrently capturing the third at least one image by the camera for a third exposure time equal to the third projection time, wherein the third projection time is different from the first projection time and the second projection time; and
wherein generating a composite depth image comprises generating the composite depth image by combining the first depth image, the second depth image, and the third depth image.

3. The method of claim 1, wherein the structured light pattern is a time-multiplexed structured light pattern and wherein the first at least one image and the second at least one image comprise an image for each pattern in the time-multiplexed structured light pattern.

4. A structured light imaging device comprising:
a projector configured to project a structured light pattern into a scene;
a camera configured to capture images of the scene; and
a non-transitory memory configured to store software instructions that, when executed by at least one processor comprised in the structured light imaging device, cause the at least one processor to:
generate a first depth image based on a first at least one image of the scene, wherein the first at least one image is captured by projecting a structured light pattern into the scene by the projector for a first projection time and concurrently capturing the first at least one image by the camera for at least a first exposure time equal to the first projection time;
generate a second depth image based on a second at least one image of the scene, wherein the second at least one image is captured by projecting the structured light pattern into the scene by the projector for a second projection time and concurrently capturing the second at least one image by the camera for at least a second exposure time equal to the second projection time, wherein the second projection time is different from the first projection time; and
generate a composite depth image by combining the first depth image and the second depth image.

5. The structured light imaging device of claim 4, wherein the instructions further cause the at least one processor to:
generate a third depth image based on a third at least one image of the scene, wherein the third at least one image is captured by projecting the structured light pattern into the scene by the projector for a third projection time and concurrently capturing the third at least one image by the camera for at least a third exposure time equal to the third projection time, wherein the third projection time is different from the first projection time and the second projection time; and
wherein the instructions that cause the at least one processor to generate a composite depth image include instructions that cause the at least one processor to generate the composite depth image by combining the first depth image, the second depth image, and the third depth image.

6. The structured light imaging device of claim 4, wherein the structured light pattern is a time-multiplexed structured light pattern, and wherein the first at least one image and the second at least one image comprise an image for each pattern in the time-multiplexed structured light pattern.

7. A method comprising:
generating, with one or more processors, a first depth image based on a first image captured by a camera using a first exposure time, wherein the first image is captured by the camera by capturing a first plurality of images projected by a projector, the first plurality of images including a time-multiplexed structured light pattern;
generating, with the one or more processors, a second depth image based on a second image captured by the camera using a second exposure time, wherein the second image is captured by the camera by capturing a second plurality of images projected by the projector, the second plurality of images including a time-multiplexed structured light pattern; and
combining, with the one or more processors, the first depth image and the second depth image to generate, a composite depth image.

* * * * *